Oct. 28, 1941.                O. J. HOLMES                2,260,569
                        MOTION PICTURE PROJECTOR
                        Filed Jan. 29, 1940          5 Sheets—Sheet 1

INVENTOR.
Oscar J. Holmes
BY: Cox & Moore
ATTORNEYS.

Oct. 28, 1941.   O. J. HOLMES   2,260,569
MOTION PICTURE PROJECTOR
Filed Jan. 29, 1940   5 Sheets-Sheet 2

INVENTOR.
Oscar J. Holmes
BY Cox & Moore
ATTORNEYS.

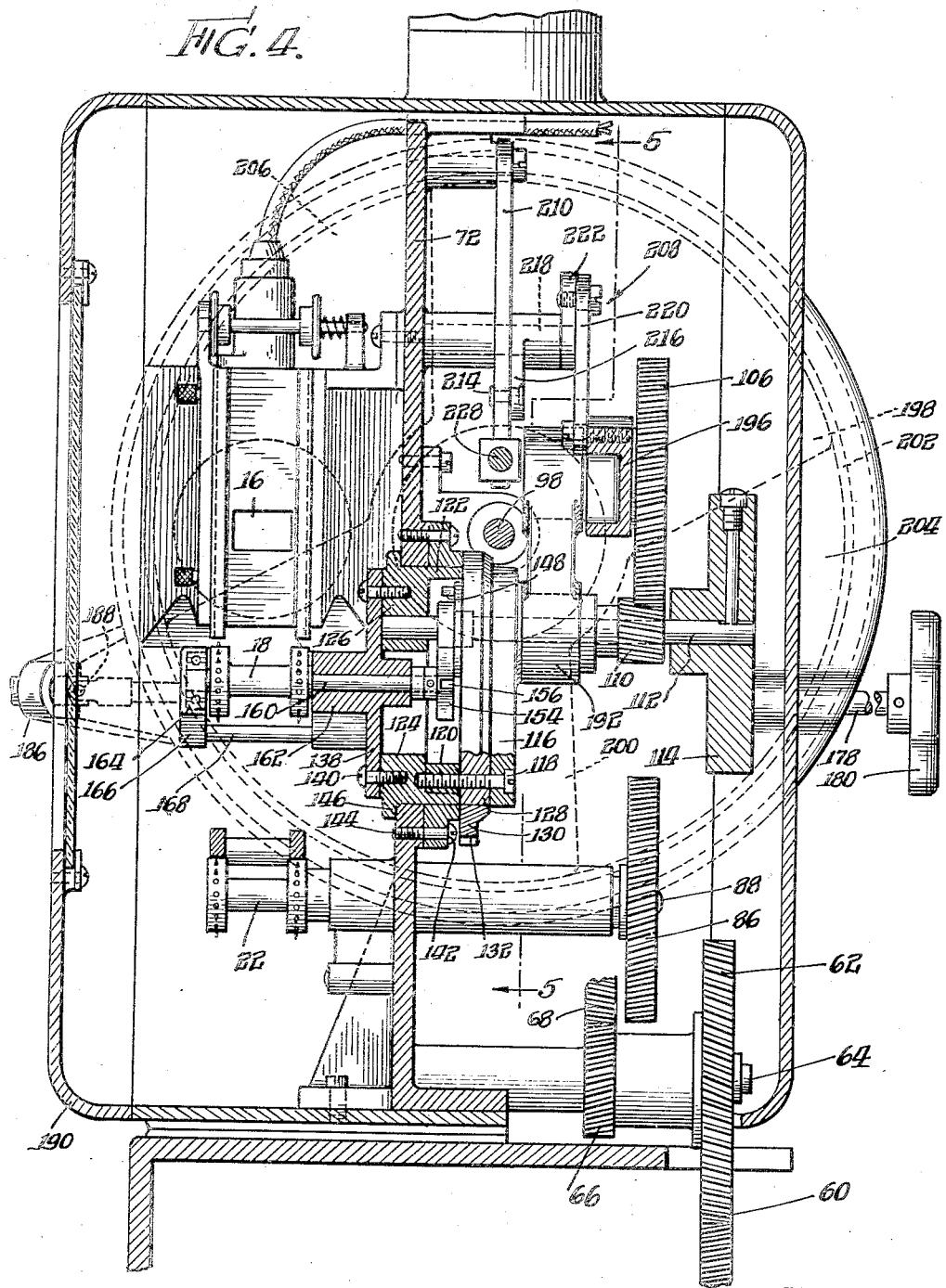

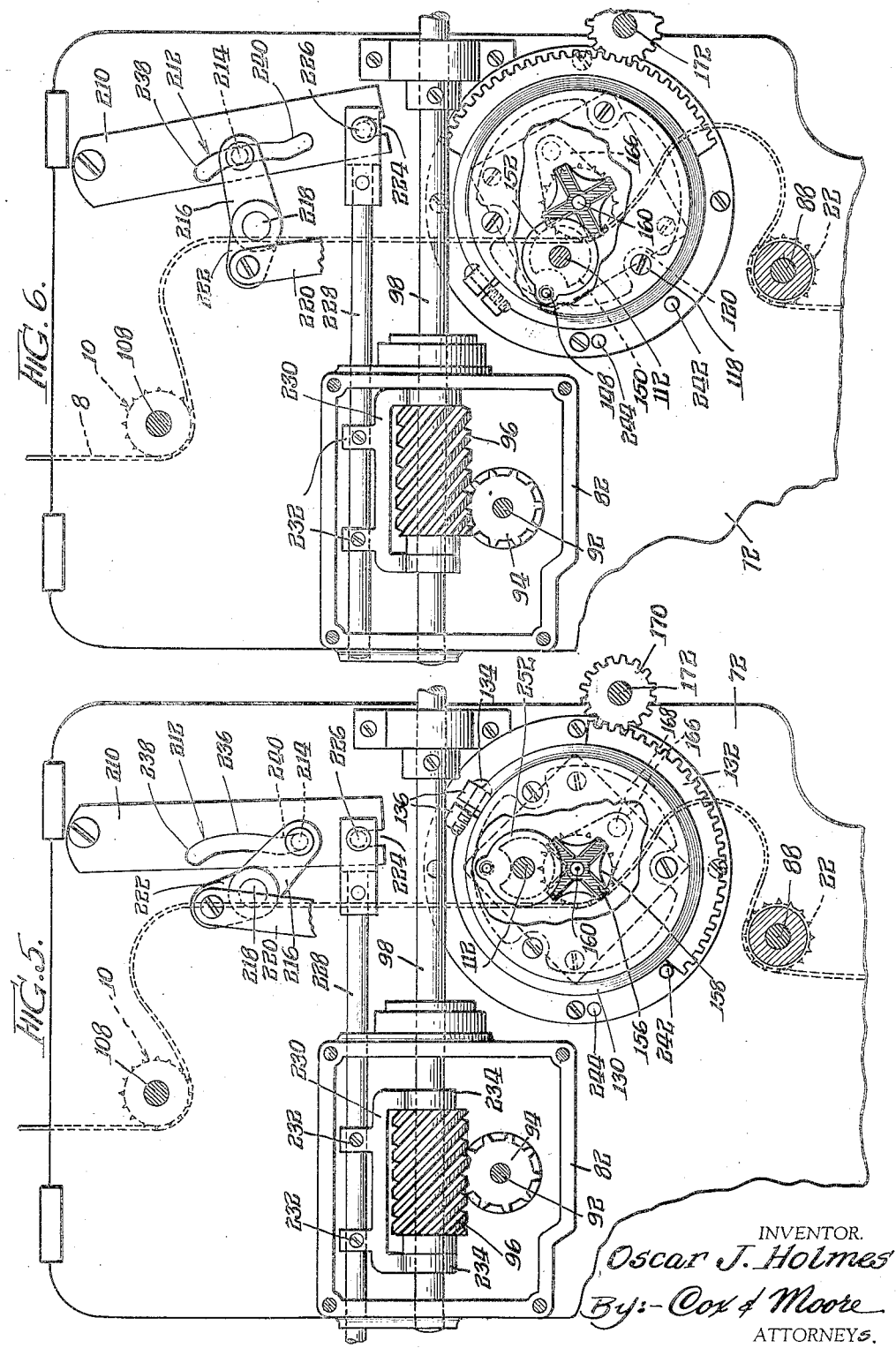

Patented Oct. 28, 1941

2,260,569

UNITED STATES PATENT OFFICE 2,260,569

MOTION PICTURE PROJECTOR

Oscar J. Holmes, Chicago, Ill.

Application January 29, 1940, Serial No. 316,085

7 Claims. (Cl. 88—18.3)

This invention relates to a motion picture projector, more particularly to the framing mechanism of such projector.

It is an object of applicant's invention to provide a framing mechanism which is relatively simple as compared with known framing mechanisms, and which is rugged in character and inexpensive to manufacture.

More particularly, it is an object of applicant's invention to provide in a motion picture projector a framing mechanism which may be operated or adjusted during operation of the projector and which simultaneously adjusts the intermittent motion mechanism and the shutter to frame the picture in the picture aperture or gate and to maintain the operation of the shutter in proper synchronism with the movement of the film into and out of the picture aperture or gate.

Other and further objects of the invention will be apparent from the following description when taken in connection with the accompanying drawings wherein:

Fig. 4 is an enlarged fragmentary view in vertical section taken substantially along the line 4—4 of Fig. 1.

Fig. 5 is a fragmentary view in vertical section taken substantially along the line 5—5 of Fig. 4, and with certain parts broken away for purposes of illustration.

Fig. 6 is a view similar to Fig. 5 but showing certain parts in a different position of operation or adjustment.

Figure 1:
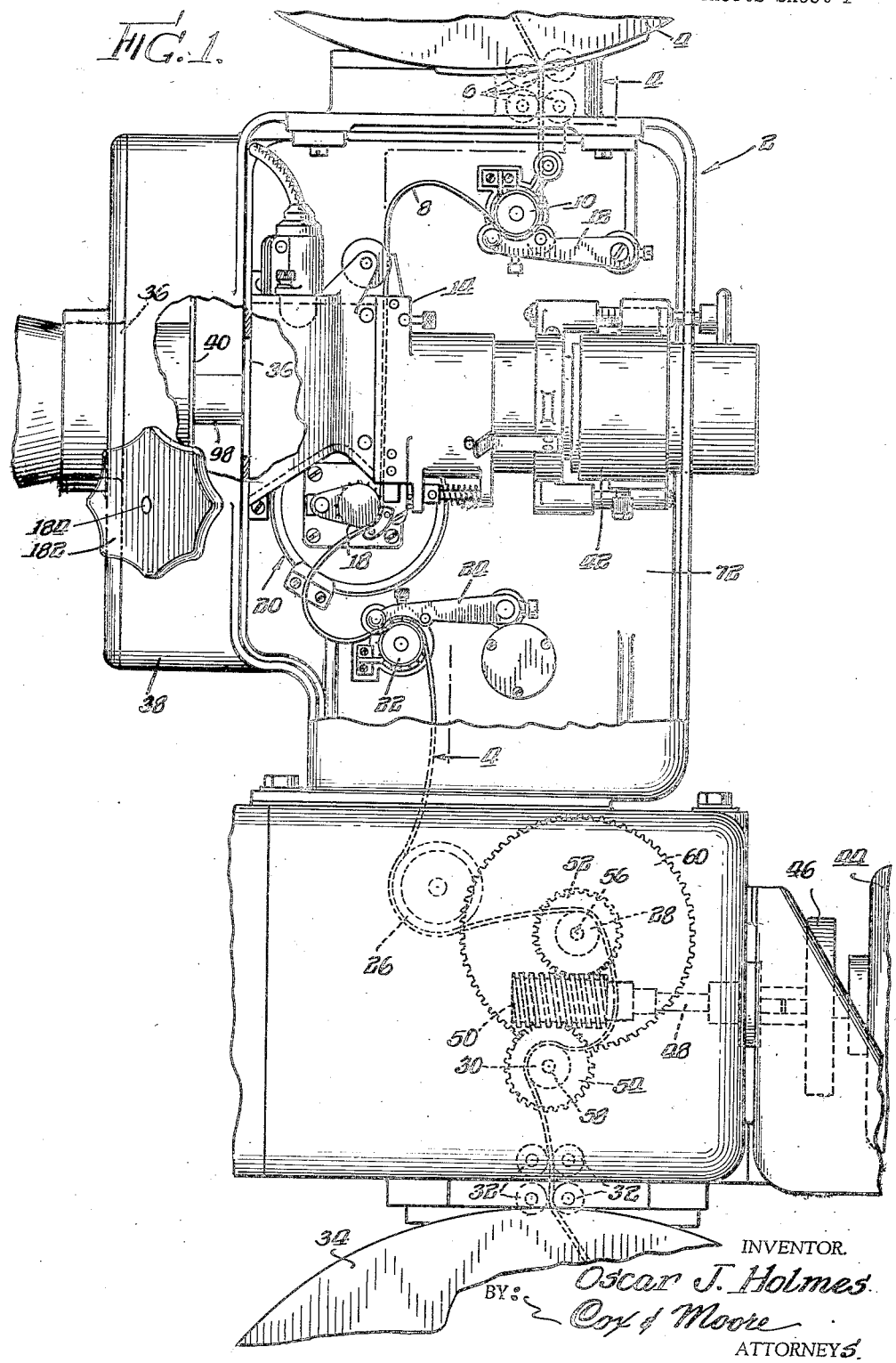
Fig. 1 is a fragmentary view and elevation of a motion picture projector machine, certain parts of the machine being cut away for purposes of illustration.

As shown in the drawings the invention may be embodied in a motion picture projector 2, more specifically a sound-on-film projector, having a film supply reel 4, sets of guide rollers 6, between which rollers the film 8 passes from the reel to a feed sprocket 10, on which the film is held by a tensioned guide 12. The film 8 passes from the feed sprocket through a picture gate structure 14, having an exposure opening or "picture aperture" 16 (Fig. 4), to the feed sprocket 18 of an intermittent motion mechanism 20 by which the film is fed intermittently into and out of the picture aperture. From the intermittently driven sprocket 18 the film passes to the feed sprocket 22 on which the film is held by the tension guide 24 and from the feed sprocket 22 the film passes over the drum 26 which forms part of the sound reproducing mechanism of the projector. From the drum 26 the film passes over the guide rollers or feed sprockets 28 and 30 and between the sets of guide rollers 32 to the film take-up reel 34.

The projecting beam of light passes from a source not shown through openings 36 in the opposite vertical walls of a housing 38 in which operates a shutter 40 which periodically intercepts or interrupts the projecting beam. The projecting beam when not cut off by the shutter passes through the picture aperture 16 of the picture gate 14, through the film 8 and is projected upon the screen by the conventional adjustable optical system 42.

An electric motor 44 through a coupling 46 drives the shaft 48 to which a worm 50 is secured. Worm 50 meshes with worm gears 52 and 54 secured to the shafts 56 and 58 respectively of the feed sprockets 28 and 30. A gear 60 is secured to and driven by the shaft 56, the gear 60 meshing with an idler gear 62 on a shaft 64. A gear 66 secured to the shaft 64 drives an idler gear 68 on a shaft 70.

The shafts 64 and 70 are mounted upon and journaled in the wall plate 72.

Figure 2:
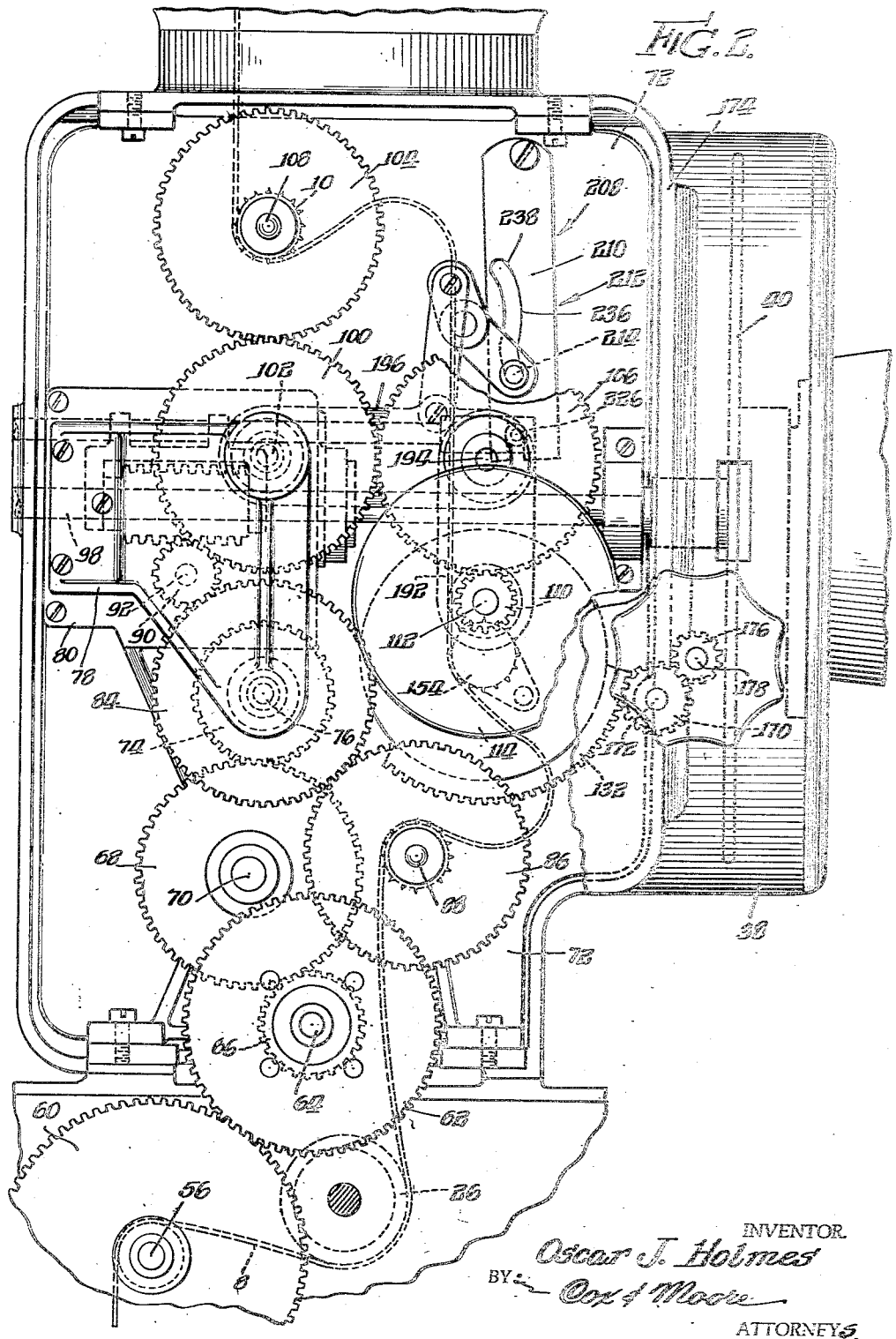
Fig. 2 is an enlarged fragmentary view and elevation taken from the opposite side of the machine from that shown in Fig. 1, with certain parts being broken away for purposes of illustration.

The gear 68 also drives a gear 74 secured to a shaft 76, journaled in the wall plate 72 and in the depending arm of a bracket 78, the bracket 78 being secured to the cover plate 80 of a housing 82 (Figs. 5 and 6) formed in the wall plate 72. The shaft 76 drives a gear 84 secured thereto and meshing with a gear 86 on the shaft 88 of the feed sprocket 22, and the gear 84 also meshes with a gear 90 on a shaft 92 journaled on the bracket 78 and the cover plate 80 and projecting into the housing 82. Within the housing 82, which is filled with a suitable lubricant, the shaft 92 carries a helical gear 94 (Figs. 5 and 6) meshing with a helical gear 96, the gear 96 driving the shaft 98 that projects into the shutter housing 38 and carries the shutter 40 (see Figs. 1 to 3).

The gear 90 also drives an idler gear 100 mounted on a stud shaft 102 journaled in the bracket 78 and the cover plate 80. The idler gear 100 drives gears 104 and 106, the gear 104 being secured to the shaft 108 of the feed sprocket 10. The gear 106 meshes with the driving gear 110 for the intermittent motion mechanism 20, which gear 110 is mounted on a shaft 112 on the outer end of which is secured the fly-wheel 114 by which the speed of operation of the intermittent motion mechanism is maintained substantially constant.

The intermittent motion mechanism 20 comprises a disk 116 secured as by screws 118 to the inwardly projecting bosses 120 formed in the annular flange 122 of a ring 124. The shaft 112 is journaled in the disk 116 and in an inwardly projecting boss or portion 126 of the ring 124. A spacing ring 128 is interposed between the disk 116 and the annular flange 122 of ring 124, the screws 118 passing through this ring 128. A split ring 130, preferably of bronze, and having a gear sector 132 formed thereon or secured thereto is clamped on the ring 128 as by a screw 134 received in radially projecting ears 136 of the split ring. One end of the housing formed by the rings 124 and 128 is closed by the disk 116, and the other end is closed by a cover plate 138 fastened to the ring 124 as by screws 140. This housing for the intermittent motion mechanism contains suitable lubricant and is mounted for rotary adjustment in an aperture in the wall plate 72 as shown in Fig. 4 and in the ring 142 fastened to the wall plate 72 as by screws 144. Endwise shifting of the housing is prevented by engagement of the split ring 130 with the face of the ring 142, and by the engagement of an annular flange 146 formed on the ring 124 with the face of the wall plate 72.

The driving pin 148 and locking ring 150 of a Geneva movement mechanism are formed with or mounted on a disk 152 secured to the shaft 112 between the disk 116 and the ring 124. The wheel 154 of the Geneva movement mechanism is provided with the usual pin-receiving cross slots 156 receiving the driving pin 148 and the usual connecting sections 158 having part circular edges engaging the periphery of the locking ring 150. The Geneva wheel 154 is secured to the inner end of the shaft 160 for the intermittently driven feed sprocket 18. The shaft 160 is journaled on a boss 162 formed in the cover plate 138 of the housing for the intermittent motion mechanism and in a ball bearing 164 mounted in a plate 166 supported by the rod 168 on the cover plate 138.

The gear sector 132 meshes with and is driven by a gear 170 secured to a shaft 172 mounted in a suitable bracket fastened to the rear wall 174 of the projector housing. The gear 170 is driven by the adjusting gear 176 mounted on adjusting shaft 178 journaled in and extending transversely of the shutter housing 38. An adjusting wheel or knob 180 is secured at one end of the shaft 178, and a second adjusting wheel or knob 182 is operatively connected to the other end of the shaft 178. The wheel or knob is carried by a stud shaft 184 journaled in a bracket 186 secured to the shutter housing 38, the shaft 184 being connected by a universal joint 188 to the shaft 178 so that the shaft 184 may extend at an angle to the shaft 178 and the wheel or knob 182 disposed out of the path of movement of the door or closure 190 for the projector housing.

Upon manipulation of either of the adjusting wheels or knobs 180 and 182 the gear 176 drives the gear 170 which in turn drives the gear sector 132. Adjusting movement of the gear sector 132 is transmitted to the disk 116 through the split ring 130, the ring 128, and the screws 118. The ring 124 rotates with the disk 116. The axes of the shaft 160 and the disk 116 are coincident, and hence upon rotation of the disk 116 the shaft 112 moves about the axis of the shaft 160 and the driving pin 148 and the locking ring 150 also move about the axis of this shaft 160. Consequently as the gear sector 132 is rotatably adjusted, the Geneva wheel 154 and the shaft 160 are rotatably adjusted by the driving pin 148 or locking ring 150; but since the driving pin and locking ring, the Geneva wheel 154 and the shaft 160 all rotate about the same axis, no relative movement occurs between the Geneva wheel and such driving pin or locking ring. The intermittently driven feed sprocket 18 thus experiences an angular adjustment which may be in the direction of normal operation of the feed sprocket or opposite thereto so as to frame the picture in the picture aperture 16.

The driving shaft 112 of the intermittent motion mechanism thus swings or revolves about the axis of the shaft 160 during an adjusting operation and the driving gear 110 secured to this shaft is maintained in driving engagement with the gear 106 by a link 192 which is journaled at its lower end on the shaft 112 and at its upper end on the shaft 194 to which the gear 106 is secured. The shaft 194 is supported by and journaled in one end of a bracket, arm or link 196, journaled at its other end on the shaft 102 for the gear 100. Thus as the driving element of the Geneva movement mechanism revolves about the axis of the driven Geneva wheel to effect a rotation of this wheel and framing of the picture, the driving gear 110 revolves about the axis of the Geneva wheel and the gear 106 which drives this gear 110 revolves about the axis of the gear 100 and is maintained in meshing engagement therewith by the supporting bracket, arm or link 196.

Adjustment of the intermittent motion mechanism effects the proper framing of the picture in the picture aperture. However, if a substantial adjustment of the intermittent motion mechanism is necessary to properly frame the picture the film may be in motion during the time that the shutter uncovers the picture aperture and the projected picture upon the screen "flutters." The shutter 40 may be of the usual construction embodying a pair of opposed light opaque angularly spaced plates or sectors 198 and 200 (Fig. 4) having a hub secured to the shutter driving shaft 98 and fastened at their outer edges to the wire like rim 202. The shutter plates 198 and 200 successively at regularly spaced intervals interrupt the projecting beam of light while the openings 204 and 206 between these plates successively uncover the picture aperture. The shutter is driven at such a speed in relation to the speed of operation of the intermittent motion mechanism as to complete one revolution during the time that a picture frame is being moved into the picture aperture and a beam of light projected therethrough. Consequently it will be seen that one of the shutter plates, as for example the plate 198, regularly interrupts the beam of light during the time the film is moving into the picture aperture while the other plate interrupts the beam of light during the time that the film is stationary in the picture aperture and between two projecting intervals when the picture is exposed first for example by the shutter opening 204 and then by the shutter opening 206. In other words, the picture is not exposed during all the time that the picture frame remains stationary in the picture aperture but the exposure of the picture is interrupted during this time by one of the shutter plates, as for example the plate 200. When, as in prior devices, the intermittent motion mechanism is adjusted to frame the picture without regard to the position of the shutter it frequently occurs that the film is in motion during the time that the shutter opening 204 permits the projecting beam of light to pass through the picture aperture, and consequently the picture upon the screen appears to "flutter." Accordingly applicant's invention provides connecting means 208 for connecting the adjusting or driving mechanism for the intermittent motion mechanism to the shutter or shutter driving mechanism for adjusting the position of the shutter in relation to the picture aperture as the intermittent motion mechanism is adjusted to frame the picture in this aperture. This connecting means comprises a lever 210 having a cam slot 212 receiving a roller or pin 214. The pin or roller 214 is carried by a lever 216 on the stud shaft 218 journaled in the wall plate 72. The shaft 218 is angularly adjusted by means of a link 220 pivotally secured at its lower end to the bracket, arm or link 196 and at its upper end to a crank or lever 222 secured to the shaft 218. It will be evident that as the intermittent motion mechanism is adjusted to frame the picture the cam pin or roller 214 is swung in an arc about the axis of the shaft 218. The lever 210 is provided at its lower end with a slot 224 in which is received the unthreaded shank portion of a cap screw or bolt 226 threaded into the outer end of a slide rod 228. The slide rod 228 projects into the housing 82 and is slidably mounted in the opposed end walls of this housing. Within this housing the slide rod 228 carries a yoke 230, fastened thereto as by the screws 232, the depending arms 234 of the yoke embracing the shutter drive shaft 98 and engaging or abutting the opposite ends of the helical gear 96, which gear is splined on shaft 98 for axial movement relative thereto while rotating therewith.

The cam slot 212 in the lever 210 is preferably formed with a substantially central portion 236 concentric to the axis of the shaft 218 and formed about a central radius equal to the distance between the center of the cam pin or roller and the center of the shaft 218. The opposed end portions 238 and 240 extend in opposite directions relative to the axis of the shaft 218, and are eccentric to this axis.

Figure 3:
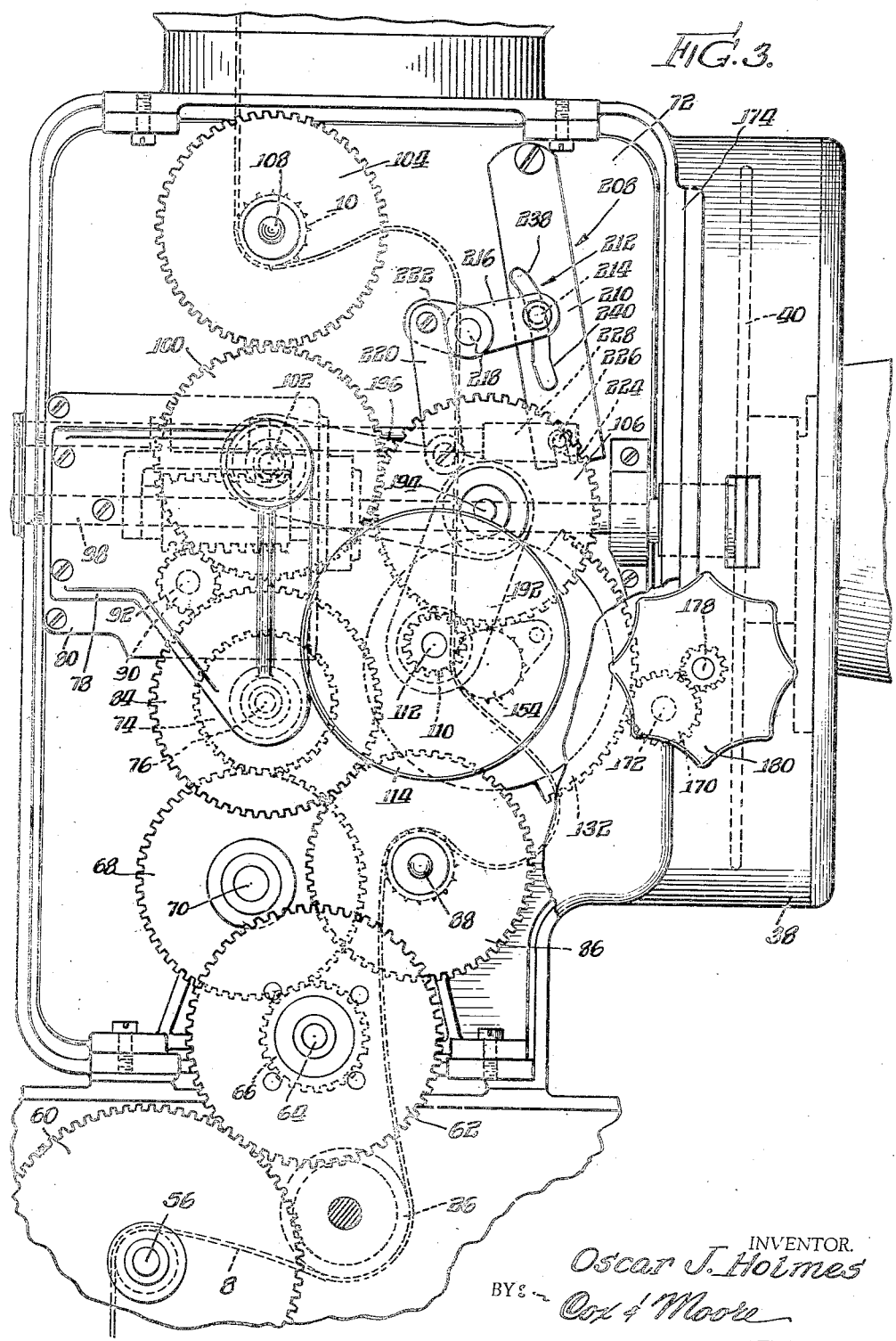
Fig. 3 is a view similar to Fig. 2, with certain parts in a different position of operation or adjustment.

As the gear sector 132 is rotatably adjusted to adjust the intermittent motion mechanism and thereby frame the picture, the revolution of the shaft 112 about the shaft 160 causes a raising or lowering of the link 192 and the bracket, arm or link 196. This motion of the link 196 causes through the link 220, the crank 222, the shaft 218 and the lever 216 a revolving of the cam pin or roller 214 about the axis of the shaft 218. So long as the cam pin traverses the substantially central portion 236 of the cam slot no movement, or substantially no movement, of the lever 210 occurs, and the lever remains in an extreme position to the right as shown in Figures 3 and 6. However, as the cam pin or roller traverses the portion 238 or the portion 240 of the cam slot the lever 210 is moved from or to the extreme position shown in Fig. 6, and to or from the extreme position to the left shown in Fig. 5. As the lever 210 swings to the left the slide rod 228, the yoke 230, and the helical gear 96 are moved rectilinearly to the left. Since the rotary driving force is applied to the gear 96 by the gear 94 this axial, rectilinear movement of the gear 96 causes it and the shutter shaft to rotate, say for example in a counter-clockwise direction as seen in Fig. 4. Since the shutter is assumed for purposes of illustration to be driven in a clockwise direction, as seen in Fig. 4, this counter-clockwise movement of the shutter in effect retards the shutter so that the exposure of the picture frame occurs at a later instant. The movement of the slide 228 to the left which occasions this counterclockwise rotation of the shutter is effected as the cam pin or roller moves from the central portion 236 of the slot 212 into the end portion 238 or into the end portion 240. The cam pin or roller moves from the central portion 236 of the slot into the end portion 238 as the gear sector 132 is rotated in a counter-clockwise direction, as seen in Figs. 2, 3, 5, and 6. The cam pin or roller moves from the central portion 236 into the end portion 240 as the gear sector 132 is rotated in a clockwise direction as seen in these figures. Counter-clockwise rotation of the gear sector causes a counter-clockwise rotation of the intermittently driven feed sprocket 18 in the direction of the film feed, and clockwise rotation of the gear sector causes a clockwise rotation of the intermittently driven feed sprocket 18 opposite to the direction of the film feed. The rotary adjustment of the gear sector 132 is limited by spaced pins 242 and 244 secured to the stationary ring 142 into position to engage the gear sector 132 and an ear 136 of the split clamping ring 130. This range of adjustment of the gear sector is preferably sufficient to frame the picture through one and one-half frames. Assuming, that the cam pin or roller 226 lies at the bottom of the slot 212 when the gear sector 132 engages the stop pin 242, adjustment of the gear sector in a counter-clockwise direction first causes the gear 96 to be moved axially to the right to cause rotation of the shutter shaft 98 clockwise or in the direction of drive, then maintains the gear against axial movement for a given interval during the adjustment of the gear sector, and finally causes the gear 96 to be moved axially to the left to rotate the shutter shaft in the opposite direction or counter-clockwise. Thus it will be seen that regardless of the position of the cam pin or roller 226 and the slot 212 when the film is threaded over the feed sprocket 18 the shutter may be simultaneously adjusted with the intermittent motion mechanism sufficiently to prevent the light passing portions or openings in the shutter from uncovering the picture aperture when the feed sprocket 18 is rotated by the engagement of the Geneva pin with the Geneva wheel.

The central portion 236 of the slot permits the shutter to remain unadjusted when the intermittent motion mechanism is relatively adjusted within a range of movement which would not cause the shutter opening to uncover the picture aperture while a picture frame is being moved into the picture aperture. The opposed end portions 238 and 240 of the cam slot on the other hand cause the adjustment of the shutter when the timing of the intermittent motion mechanism and the shutter would be so affected as to otherwise cause a shutter opening to uncover the picture aperture as a picture frame is moved into the picture aperture.

It will be evident from the foregoing description that applicant has provided a framing mechanism for a motion picture projector which mechanism is relatively simple as compared with known framing mechanisms, and which is rugged in character and inexpensive to manufacture; and more particularly has provided in a motion picture projector a framing mechanism which may be operated or adjusted during operation of the projector, and which simultaneously adjusts the intermittent motion mechanism and the shutter to frame the picture in the picture aperture or gate, whereby to maintain the operation of the shutter in proper synchronism with the movement of the film into and out of the picture aperture or gate.

I claim:

1. A film projector including a member having a light transmitting aperture, a shutter controlling the intermittent passage of light through said aperture, an intermittent Geneva movement mechanism for intermittently feeding the film past said aperture, adjustable means mounting the driving element of the Geneva movement mechanism for revolution about the axis of the driven element of the Geneva movement mechanism to cause the driven element to rotate with, but not relative to, the driving element to vary the position of the film relative to the aperture, driving means for the Geneva movement mechanism and the shutter for actuating said mechanism and said shutter in proper timed relation, said driving mechanism including a driving gear, a driven gear axially adjustable and operatively connected to the shutter to vary the position of the shutter relative to the aperture, a second driving gear operatively connected to the first driving gear for simultaneous rotation therewith and about a fixed axis, a second driven gear meshing with said second driving gear and mounted for revolution about said fixed axis, said intermittent motion mechanism including a gear mounted upon said adjustable mounting means and operatively connected to the driving element of the Geneva movement mechanism to actuate said element, means for causing said gear of the intermittent motion mechanism to revolve about the axis of said second driven gear while in meshing engagement with said second driven gear, means for adjusting said mounting means for the driving element of the intermittent motion mechanism and means operatively connected to said adjusting means for simultaneously adjusting the first driven gear axially whereby the position of the shutter relative to the picture aperture is simultaneously varied with the variation in the position of the film relative to the picture aperture.

2. A film projector including a member having a light transmitting aperture, a shutter controlling the intermittent passage of light through said aperture, an intermittent Geneva movement mechanism for intermittently feeding the film past said aperture, adjustable means mounting the driving element of the Geneva movement mechanism for revolution about the axis of the driven element of the Geneva movement mechanism to cause the driven element to rotate with, but not relative to, the driving element to vary the position of the film relative to the aperture, driving means for the Geneva movement mechanism and the shutter for actuating said mechanism and said shutter in proper timed relation, said driving mechanism including a driving gear, a driven gear axially adjustable and operatively connected to the shutter to vary the position of the shutter relative to the aperture, a second driving gear operatively connected to the first driving gear for simultaneous rotation therewith and about a fixed axis, a second driven gear meshing with said second driving gear and mounted for revolution about said fixed axis, said intermittent motion mechanism including a gear mounted upon said adjustable mounting means and operatively connected to the driving element of the Geneva movement mechanism to actuate said element, means for causing said gear of the intermittent motion mechanism to revolve about the axis of said second driven gear while in meshing engagement with said second driven gear, means for adjusting said mounting means for the driving element of the intermittent motion mechanism and means operatively connected to said adjusting means for simultaneously adjusting the first driven gear axially whereby the position of the shutter relative to the picture aperture is simultaneously varied with the variation in the position of the film relative to the picture aperture, said connections including a lever having a slot of selected configuration therein, a connection between said lever and the first driven gear, and connections between the second driven gear and said lever including a pin engaging in the slot of said lever for shifting said lever in response to the revolution of said second driven gear about the fixed axis of rotation of the second driving gear.

3. A film projector including a member having a light transmitting aperture, a shutter controlling the intermittent passage of light through said aperture, an intermittent motion mechanism for intermittently feeding the film past said aperture, adjustable means mounting the driving element for the intermittent motion mechanism for revolution about the axis of the driven element of the intermittent motion mechanism to cause the driven element to rotate with the driving element to vary the position of the film relative to the aperture, a gear driving the driving element of the intermittent motion mechanism and mounted upon said adjustable mounting means for revolution with the driving element about the axis of the driven element, a main driving gear rotatable on a fixed axis, an intermediate gear rotatable on an axis revolvable about the axis of the main driving gear and in intermeshing engagement with the main driving gear and with the driving gear for the intermittent motion mechanism, means for maintaining the intermediate gear in intermeshing relation with the main driving gear and the gear for the intermittent motion mechanism as the intermediate gear revolves about the axis of the main gear and the gear for the intermittent motion mechanism revolves about the axis of the driven element of said mechanism, means for driving said shutter in synchronism with said main driving gear, and means operatively connected to said adjustable mounting means and to said driving means for the shutter for effecting a relative movement between the shutter and the main driving gear as the adjustable mounting means for the intermittent motion mechanism is adjusted to vary the position of the film relative to the aperture.

4. A film projector including a member having a light transmitting aperture, a shutter controlling the intermittent passage of light through said aperture, an intermittent motion mechanism for intermittently feeding film past said aperture, said intermittent motion mechanism including driving and driven elements, adjustable means mounting one of said elements for bodily revolution about the axis of rotation of the other element to cause the driven element to rotate to vary the position of the film relative to the aperture, driving and driven gears operating said intermittent motion mechanism, the driven gear being operatively connected to the driving element of the intermittent motion mechanism, means for driving the shutter in synchronism with the driving one of said gears, said shutter driving means including driving and driven gears of which one is bodily shiftable to vary the position of the shutter relative to the aperture while maintaining the operation of the shutter in synchronism with the first-mentioned driving gear, a crank operatively connected to the adjustable mounting means for rotation upon adjustment of said mounting means, a roller carried by the free end of said crank, a shiftable member having a cam slot therein receiving said roller and means operatively connecting said member to the bodily shiftable gear of the shutter driving means thereby to bodily shift such gear upon adjustment of said mounting means for the intermittent motion mechanism.

5. A film projector including a member having a light transmitting aperture, a shutter controlling the intermittent passage of light through said aperture, an intermittent motion mechanism for intermittently feeding film past said aperture, said intermittent motion mechanism including driving and driven elements, adjustable means mounting one of said elements for bodily revolution about the axis of rotation of the other element to cause the driven element to rotate to vary the position of the film relative to the aperture, driving and driven gears operating said intermittent motion mechanism, the driven gear being operatively connected to the driving element of the intermittent motion mechanism, means for driving the shutter in synchronism with the driving one of said gears, said shutter driving means including driving and driven gears of which one is bodily shiftable to vary the position of the shutter relative to the aperture while maintaining the operation of the shutter in synchronism with the first-mentioned driving gear, a crank operatively connected to the adjustable mounting means for rotation upon adjustment of said mounting means, a roller carried by the free end of said crank, a shiftable member having a cam slot therein receiving said roller, means operatively connecting said member to the bodily shiftable gear of the shutter driving means thereby to bodily shift such gear upon adjustment of said mounting means for the intermittent motion mechanism, said slot having a portion thereof concentric to the axis of said crank to permit adjustment of the mounting means for the intermittent motion mechanism through a predetermined range without varying the position of the shutter relative to the aperture.

6. A film projector including a member having light transmitting aperture, intermittent motion mechanism including driving and driven elements for feeding the film past said aperture, a shutter controlling the intermittent passage of light through said aperture, means for synchronously driving said shutter and the driving element of said intermittent motion mechanism, said driving means including driving and driven timing gears of which the driven gear is connected to and actuates the shutter, one of said gears being bodily shiftable relative to the other to vary the position of the shutter relative to the aperture and the timing of the shutter relative to the driving gear, adjustable means mounting the driving element of the intermittent motion mechanism for revolution about the axis of the driven element to vary the position of the film relative to the aperture, a lever operatively connected to said adjustable mounting means for angular adjustment upon adjustment of said mounting means, a shiftably mounted member having a slot therein for receiving a pin carried by said lever to cause shifting of said member as the adjustable mounting means is adjusted, and means connecting said shiftable member to the bodily shiftable gear of the shutter driving means whereby to effect adjustment of said shutter simultaneously with the adjustment of said adjustable mounting means.

7. A film projector including a member having light transmitting aperture, intermittent motion mechanism including driving and driven elements for feeding the film past said aperture, a shutter controlling the intermittent passage of light through said aperture, means for synchronously driving said shutter and the driving element of said intermittent motion mechanism, said driving means including driving and driven timing gears of which the driven gear is connected to and actuates the shutter, one of said gears being bodily shiftable relative to the other to vary the position of the shutter relative to the aperture and the timing of the shutter relative to the driving gear, adjustable means mounting the driving element of the intermittent motion mechanism for revolution about the axis of the driven element to vary the position of the film relative to the aperture, a lever operatively connected to said adjustable mounting means for angular adjustment upon adjustment of said mounting means, a shiftably mounted member having a slot therein for receiving a pin carried by said lever to cause shifting of said member as the adjustable mounting means is adjusted, means connecting said shiftable member to the bodily shiftable gear of the shutter driving means whereby to effect adjustment of said shutter simultaneously with the adjustment of said adjustable mounting means, the slot in said shiftable member having a predetermined portion thereof concentric with the axis of angular adjustment of said lever to permit independent adjustment of said adjustable mounting means through a predetermined range.

OSCAR J. HOLMES.